United States Patent
Merot et al.

(10) Patent No.: US 6,802,648 B2
(45) Date of Patent: Oct. 12, 2004

(54) POLYMERIC BEARING WITH ELASTOMER

(75) Inventors: Philippe Merot, Argenteuil (FR); Jean Luc Bozet, Sprimont (BE); Pierre Poysat, Jalhay (BE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 109 days.

(21) Appl. No.: 10/181,218

(22) PCT Filed: Jan. 25, 2001

(86) PCT No.: PCT/US01/02761
§ 371 (c)(1),
(2), (4) Date: Jul. 11, 2002

(87) PCT Pub. No.: WO01/55607
PCT Pub. Date: Aug. 2, 2001

(65) Prior Publication Data
US 2003/0012467 A1 Jan. 16, 2003

Related U.S. Application Data
(60) Provisional application No. 60/179,209, filed on Jan. 31, 2000.

(51) Int. Cl.$^7$ .............................................. F16C 33/20
(52) U.S. Cl. ...................... 384/215; 384/297; 384/909
(58) Field of Search ................................ 384/202, 215, 384/220, 221, 297, 299, 909, 300

(56) References Cited

U.S. PATENT DOCUMENTS

| | | | | |
|---|---|---|---|---|
| 5,143,457 A | * | 9/1992 | Langhof et al. | 384/276 |
| 5,688,054 A | * | 11/1997 | Rabe | 384/295 |
| 5,902,050 A | * | 5/1999 | Balczun et al. | 384/206 |
| 5,932,049 A | * | 8/1999 | Orndorff et al. | 384/297 |

FOREIGN PATENT DOCUMENTS

EP 10082418 * 3/1998

* cited by examiner

Primary Examiner—Thomas R. Hannon

(57) ABSTRACT

A bearing system for a rotor shaft is provided in which a bearing prepared from a high performance polymer is surrounded by an elastomer sleeve that dampens the effect of noise and vibration caused by movement of the rotor shaft against the bearing.

20 Claims, 3 Drawing Sheets

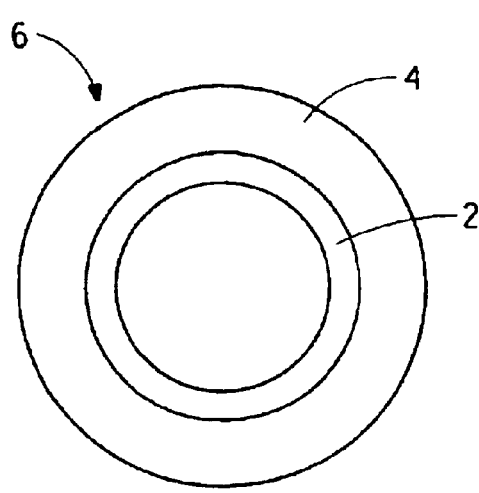
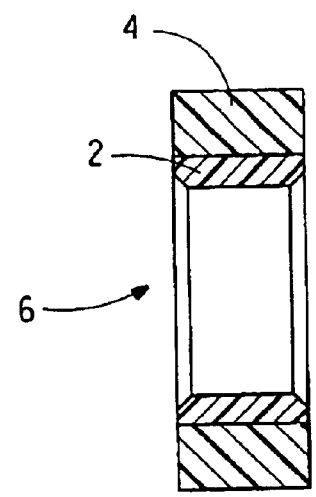
FIG. 1A    FIG. 1B
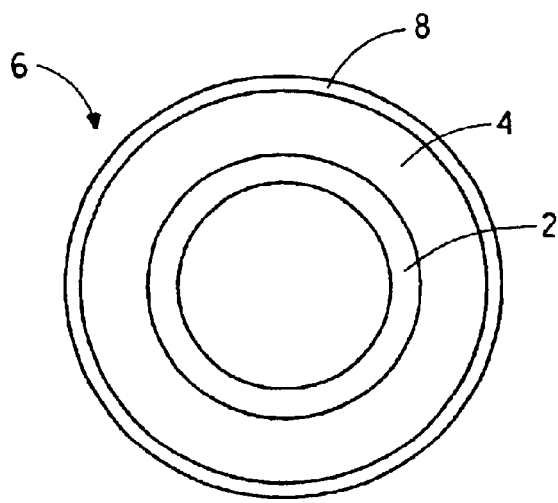
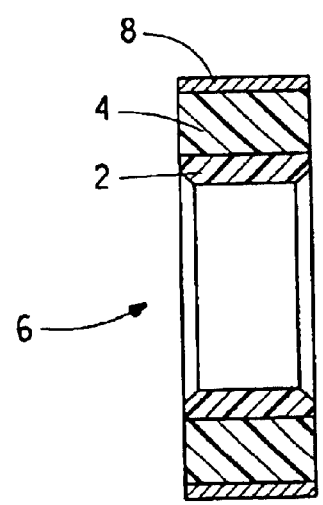
FIG. 2A    FIG. 2B

POLYMERIC BEARING WITH ELASTOMER

This application claims the benefit of the filing date of U.S. Application No. 60/179,209, filed Jan. 31, 2000, which is incorporated as a part hereof.

FIELD OF THE INVENTION

This invention relates to bearings. In particular, this invention relates to a polymeric bearing system for a rotating shaft, and a bearing surrounded by a bonded elastomer sleeve, and fractional horsepower motors containing same.

BACKGROUND OF THE INVENTION

Polymeric bearings have been used for years in many applications where the working conditions require oscillating, reciprocating, or continuous motion, such as small electrical motors. In a conventional motor, the rotor shaft extends through a housing formed from brackets that cover each end of the rotor opening, and are secured to the stator. The housing restrains the rotor shaft, and thus the rotor body, against substantial axial displacement relative to the stator, and supports bearings in which the shaft rotates. The bearings maintain stability and alignment of the rotor while allowing for substantially free rotation of the rotor shaft.

Such electrical motors are particularly needed for applications in which the motor runs for extended intervals over prolonged periods of time, which may be many years. As such, the motor must be extremely durable, highly resistant to failure and preferably requiring little maintenance over its useful life. The components which tend to be most problematic in achieving these parameters are the bearings because they are subject to persistent frictional contact with the rotating shaft over the life of the motor.

Several types of bearing systems are available. An electrical "dry" motor generally consists of a rotor with wound electrical wire fuming in a housing, called a stator, where magnets are installed circumferencially. The shaft of the rotor has to be supported by at least two bearings that function to keep the rotor well centered in the stator and provide a smooth rotation with minimal friction loss. As there is no perfect alignment, and if the motor has to turn both clockwise and counterclockwise, an axial force along the shaft is created by the system. The load then has to be carried by either a thrust washer or through the use of a ball bearing.

Polymeric plane bearings working in dry motors are known to produce much noise and vibrations that cause wear of the bearings, a significant decrease of the motor's rotational speed, and reduced motor life.

It is also known to press fit journal bearings tightly to a bearing bracket. This type of bearing may require machining after the press fitting operation, which significantly increases the manufacturing cost of the motor. Although a press fit journal bearing will remain in place in the bearing bracket during assembly, due to the interference fit between the bearing and the housing, the performance of the motor at times may be less than optimum because the fixed position of the bearing does not allow for even slight deviations in rotor shaft alignment. If the motor is jarred or bumped during operation, severe noise and vibration can result.

Also known are shaded pole type motors which typically utilize spherical diameter, oil impregnated powdered metal bearings or ball bearings held in place by die cast aluminum or zinc bearing brackets. These types of bearings require constant exposure to a lubricant. In a hydrodynamic system, the motor shaft is supported by an oil film, and it has been found that this oil film causes instability of the system. This hydrodynamic lubrication system is not applicable to the present invention since the nature of the instability phenomenon is different than that of the dry motor system to which the present invention is directed.

A continuing need has existed for a dry motor bearing system that solves the problem of noise and vibration thus allowing stable continuous rotation of the bearing, increasing motor stability and reliability and prolonging motor life.

SUMMARY OF THE INVENTION

The present invention relates to a composite bearing system where a polymeric material with good self-lubricating properties is surrounded by an elastomer sleeve having good dampening characteristics, thereby enabling the capability of dry continuous rotation of the bearing with reduced noise and vibration, thus reducing wear on the bearing and extending the life of the bearing system and of the motor.

The invention also provides a fractional horsepower motor, comprising a rotor rotationally disposed in a stator, stator windings disposed about the stator for driving the rotor and a rotating shaft rotationally fixed to the rotor, and a bearing system comprising a bearing connectedly surrounded by an elastomer sleeve to reduce noise and vibration of the bearing system thereby increasing motor stability and reliability and prolonging motor life.

In a still further aspect of the invention, the bearing system comprises a bearing retainer for ease of assembly of the bearing system into a housing of the motor.

BRIEF DESCRIPTION OF THE DRAWINGS

FIG. 1A is a cross-sectional view, and FIG. 1B is a side elevational view, of a bearing system according to the invention.

FIG. 2A is a cross-sectional view, and FIG. 2B is a side elevational view, of a bearing system according to the invention bonded onto a metal retainer.

DETAILED DESCRIPTION OF THE INVENTION

Figure 3A:
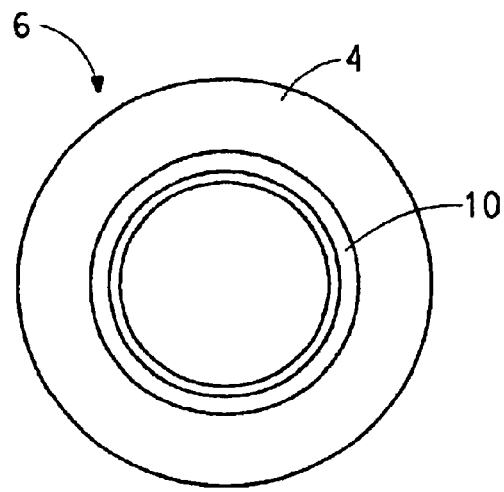
FIG. 3A is a cross-sectional view.

In order to understand the noise and vibration phenomena problems to which the present invention is directed, the phenomena were quantified experimentally and a mathematical model was developed that allowed the simulation of the instability inducing noise and vibration. Then a technical solution to the instability was proposed.

It was found that the noise and vibration problems of the prior art are in fact linked to one another due to a phenomenon called "reverse whirl". The reverse whirl phenomenon occurs when radial contact is produced between the surface of the rotating shaft and the bearing, and friction induces a tangential force on the rotor. Since the frictional force is approximately proportional to the radial component of the contact force, preconditions for instability are created. The tangential force induces a whirling motion and further a larger centrifugal force on the rotor, which in turn induces a larger radial contact force and hence a larger whirl-inducing frictional force.

This phenomenon is onset at a given level of speed combined with a given imbalance or an external disturbance. The noise is linked to the vibrations created by the reverse whirl of the rotating shaft, created when the shaft rolls on itself in the opposite direction of the rotation. Noise and vibration result directly from the bearing/shaft interface and are created by the friction between them. The system then becomes unstable. Because of the noise, the instability is called squeal. The instability is highly energy consuming and also leads to a fast wear of the bearing polymer. The noise and vibration is not caused by resonance of the motor components, as was previously hypothesized.

The stability criterion can be approximated in a first approach by $\mu < 2\epsilon$, where $\mu$ is the coefficient of friction at the bearing/shaft interface and $\epsilon$ is the percentage of critical dampening of the bushing. According to this criterion, an unstable system can be stabilized by increasing the percentage of critical dampening or by decreasing the coefficient of friction.

A composite plane bearing system was then developed where the bearing is either completely or partially surrounded by an elastomer sleeve to counterbalance the dry coefficient of friction, at the bearing/shaft interface of the polymer from which the bearing is made, by introducing an external dampening effect. The dampening significantly decreases the noise and vibration caused by the reverse whirl.

FIGS. 1A and 1B illustrate a bearing 2 surrounded by an elastomer sleeve 4 of the present invention. The bearing system 6 as illustrated can be installed directly into an electrical motor. The elastomer sleeve connected to the polymeric bearing provides a dampening effect by reducing the noise and vibration caused by contact of the shaft with the bearing.

The effectiveness of the invention in controlling noise and movement of the rotor is related to the stiffness of the elastomer from which the sleeve is made, which in turn depends on its hardness and its geometry around the bearing (wall thickness) at the operating temperature. The elastomer must be hard enough to guarantee a minimum displacement of the shaft (less than the air-gap in the case of a rotor supported by the bearings) while allowing some self-alignment between two bearings. The hardness and wall thickness depend in turn on the material of the elastomer chosen for the particular application.

The compressive characteristics of the elastomer sleeve must match the requirements of the bearing application such that there is only limited radial movement in the elastomer due to the static and dynamic loads from the rotor. This can be controlled by the elastomer's compressive properties and the wall thickness of the elastomer sleeve. For example, a motor might have an allowable rotor to housing clearance of 0.008 inches. An elastomer with a compressive deflection of 5% under the specific rotor loading would deflect 0.005 inches at a wall thickness of 0.10 inches. If this same system included an elastomer sleeve at a wall thickness of 0.300 inches the total deflection would be 0.015 inches, allowing the rotor to contact the housing. The elastomer sleeve surrounding the bearing may have a wall thickness of at least about 1 mm, preferably about 2 mm, and yet 10 mm or less, preferably 6 mm or less, and more preferably 4 mm or less, depending on the required dampening desired for the application.

Figure 3B:
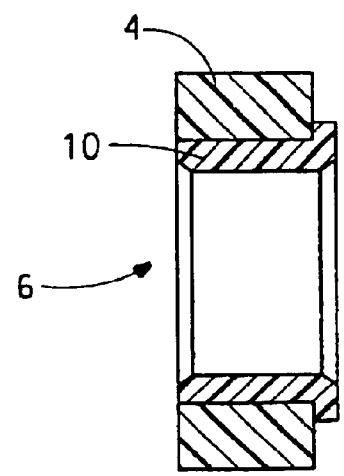
FIG. 3B is a side elevational view, of a flanged bearing surrounded by an elastomer sleeve according to the invention.

Since friction against the elastomer is undesirable, the design of the bearing/elastomer system depends on the axial loading borne by the bearing. FIGS. 3A and 3B illustrate a flanged polymeric bearing 10 connectedly surrounded by an elastomer sleeve 4. In this embodiment, the bearing/elastomer system 6 is able to replace a radial bearing and a thrust washer.

The bearing is cylindrical, and it resides in a corresponding cylindrical space of the sleeve in an interference fit. This may be accomplished by various conventional methods, including overmolding the elastomer onto the surface of the bearing; press fitting the elastomer onto the bearing; adhesively bonding the elastomer onto the bearing; attaching the elastomer by a retention mechanism onto the bearing, such as by introducing grooves on the surface of the bearing into which are inserted retention fingers of the elastomer; and other available methods of assembly. The result of this is that the elastomer sleeve is itself typically cylindrical in shape, and it is preferred that the sleeve be uniform in size and shape at all points where it surrounds the bearing.

Figure 4A:
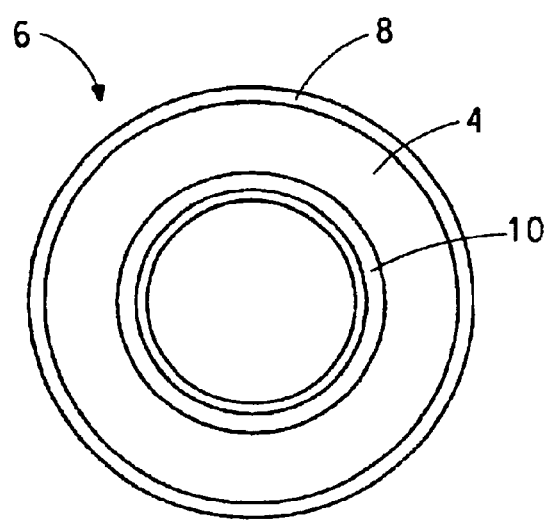
FIG. 4A is a cross-sectional view.
Figure 4B:
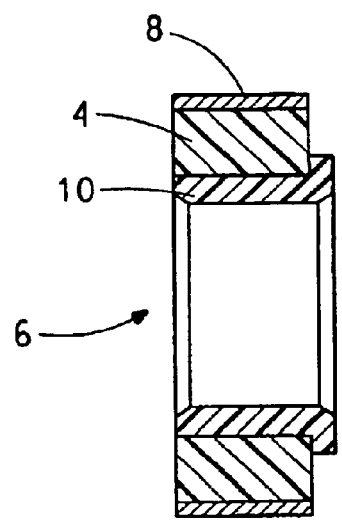
FIG. 4B is a side elevational view, of a flanged bearing surrounded by an elastomer sleeve according to the invention bonded onto a metal retainer.
Figure 5:
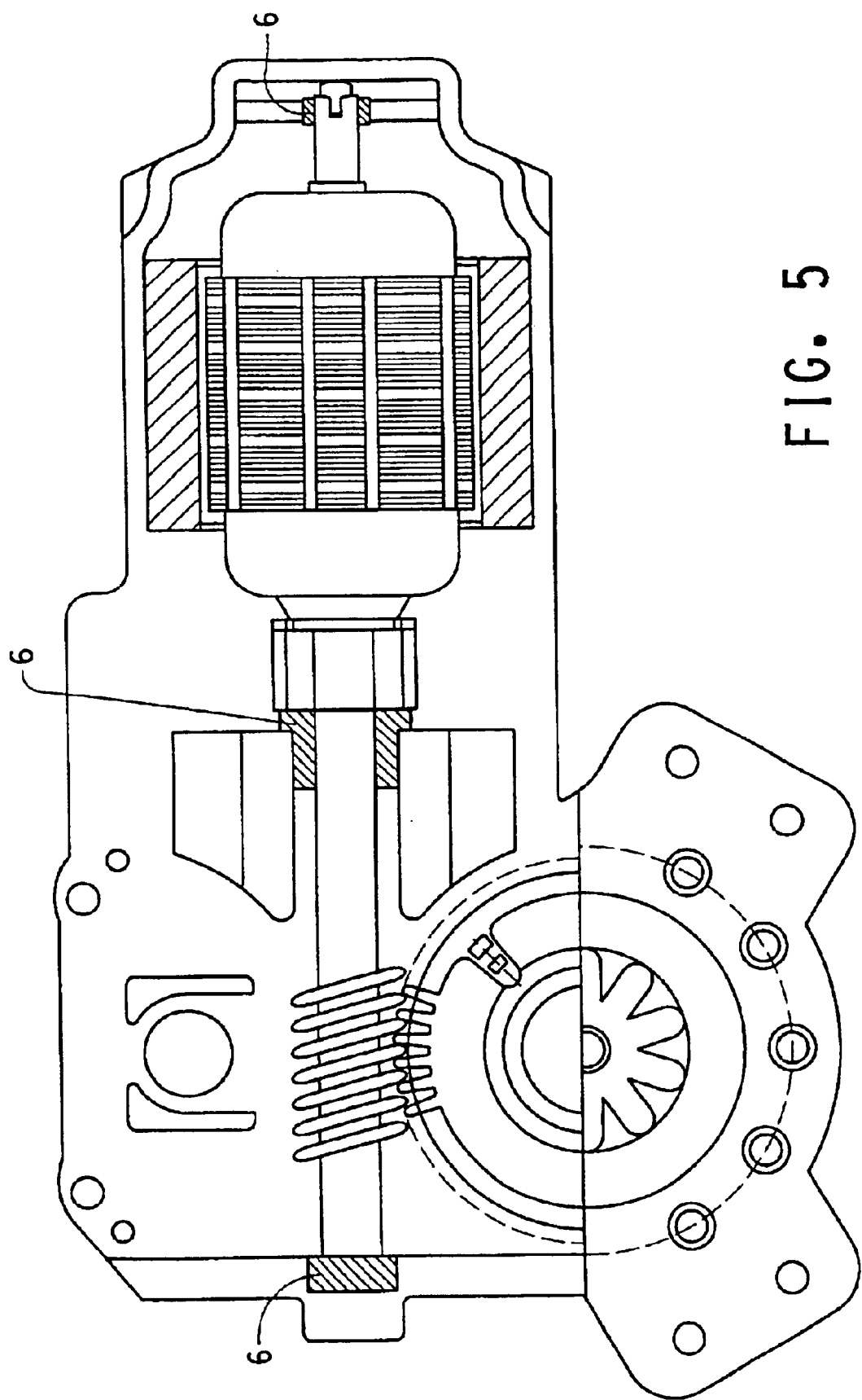
FIG. 5 is a side elevation of a motor embodying the invention.

The elastomer sleeve may longitudinally encompass the bearing entirely or only partially, depending on the desired level of dampening and noise reduction. The assembly of the bearing into the elastomer sleeve can be performed by hand or by automated equipment for high volume applications. FIGS. 2A and 2B illustrate a bearing 2 with the overmolded elastomer 4 of the present invention bonded onto a metal retainer 8. In another embodiment of the present invention, illustrated by FIGS. 4A and 4B, a metal ring 8 can be placed around the elastomer sleeve 4 in order to ease assembly of a bearing system 6, containing a flanged bearing 10, into the housing of the motor.

The bearing used in this invention may be prepared from a high performance polymer. A suitable polymer will be characterized by a low coefficient of friction, and a dimensional stability and durability such that it is able to withstand without substantial abrasion the wear it is subjected to as the rotor shaft turns. One typical method of quantitatively indicating durability of this magnitude is by a wear test that is performed using a Falex No. 1 Ring and Block Wear and Friction Tester. The equipment is described in ASTM Test method D2714. The test is performed on a sample of the polymer in the form of a block. Wear specimens are prepared by machining test blocks to provide a 6.35 mm (0.25") wide contact surface with a curvature such that it conforms to the circumference of a rotating metal mating ring having a diameter of 35 mm (1.38") and a width of 8.74 mm (0.34"). The blocks are oven dried and maintained over desiccant until tested.

After weighing, the dry block is mounted against the rotating metal ring, and the ring is loaded against the block with the selected test pressure. Rotational velocity of the ring is set at the desired speed. No lubricant is used between the mating surfaces. The ring is SAE 4620 steel, Rc 58–63, 6–12 RMS. The ring is rotated against the block for a period of 24 hours, and the friction force is recorded continuously, which allows calculation of the coefficient of friction. At the end of the test time, the block is dismounted, weighed, and the extent of wear caused by the abrasion of the ring against the block is calculated as follows: wear volume $(cm^3/hr)$= weight loss $(g)*1$/material density $(g/cm^3)*1$/test duration (hr), where * indicates multiplication.

The usefulness of a particular polymer as a material from which the bearing may be constructed is inversely proportional to the amount of wear it experiences, and to the coefficient of friction it exhibits, under conditions of service. The conditions may be described by a quantity known as PV, which is the pressure that is exerted by the abrading device (the rotor shaft) on the bearing multiplied by the velocity at which the abrading device moves. PV values are reported in MPa·m/s (Ps·ft-lb/min). Friction is the resistance to relative motion of two bodies in contact caused by inequalities in the surfaces of the respective materials from which the bodies are made. The ratio of (i) the force required to maintain a uniform velocity of one body with reference to the other to (ii) the perpendicular pressure between the surfaces is the coefficient of friction, which is a unitless value.

The polymer from which the bearing is made in this invention may be characterized by its wear value (i.e., the degree of wear it experiences at a PV value representative of that to which it is subjected while in use as a dry motor bearing), by the PV value it can withstand while demonstrating acceptable wear, or by the coefficient of friction of friction it exhibits at a PV value representative of that to which it is subjected while in use as a dry motor bearing. A low wear value and coefficient of friction are preferred at a selected PV value, and a high PV value is preferred at an acceptable degree of wear.

A suitable polymer may have a wear value in the range of about $2 \times 10^{-6}$ mm³/hr to about $2 \times 10^{-5}$/hr at a PV value representative of the conditions to which the polymer is subjected while serving as a dry motor bearing. A suitable polymer may also have a coefficient of friction of at least about 0.05, and yet about 0.3 or less, preferably about 0.2 or less, more preferably about 0.15 or less, at a PV value representative of the conditions to which the polymer is subjected while serving as a dry motor bearing. A PV value typically representative of the conditions to which the polymer is subjected while serving as a dry motor bearing may be derived from a pressure in the range of about 0.05 to about 0.25 MPa (more usually about 0.1 to about 0.15 MPa), and a velocity of about 0.2 to about 10 m/s (more usually about 0.4 to about 1.25 m/s), thus giving a PV under those circumstances of about 0.01 to about 2.5 MPa·m/s (more usually about 0.04 to about 0.2 MPa·m/s).

A bearing for use in this invention may have a wall thickness of at least about 1 mm, and yet about 4 or less, and preferably about 2 or less, mm.

Specific examples of high performance polymers that may be used for as a bearing in the present invention include, but are not limited to, polyimides, polyamides, polyamideimides, acetals, polyetheretherketones, polyetherketoneketones, polyetherimides, liquid crystal polymers, fluoropolymers, phenolics, polyethersulfides, polyphenylene sulfides, and other bearing materials commonly used in the art. Polyimides, due to their excellent self-lubricating properties, are the preferred polymeric materials. The polyimide from which Vespel® parts and shapes are manufactured by E. I. du Pont de Nemours and Company is particularly preferred due to its superior wear characteristics and extremely low coefficient of thermal expansion properties.

Depending on the desired application, the high performance polymer from which a bearing of the present invention is made may also contain additives such as a sheet silicate; a filler such as glass or carbon fiber; an internal lubricant such as graphite, silicon, poly(tetrafluoroethylen) or $MoS_2$; or other additives conventionally included in compositions made from these polymeric materials and generally known to those skilled in the art. When an internal lubricant is compounded before molding with a polymer from which a bearing is made, this use of a lubricant is to be distinguished from the use of an external lubricant on the surface at which the rotor shaft contacts the bearing. In the bearing system of this invention, the bearing is run dry, without the application of any external lubricant to the surface at which the rotor shaft contacts the bearing.

The ability of the elastomer sleeve to provide a useful extent of dampening effect is generally indicated by the tan delta of the elastomer from which the sleeve is made. Tan delta is determined by dynamic measurements, in which a sample is subjected to a periodic deformation of stress or strain, and both the elastic and viscous response of a sample are determined in one experiment. The applied periodic deformation causes a periodic response in the sample. This response may lag or lead the deformation, and this phase lag (tan delta) is a direct measurement of the ratio of the elastic to viscous contribution to the overall response in the sample. Using the phase lag and the magnitude of the response, the signal can be decomposed into the in-phase and 90 degrees out-of-phase components, the in-phase representing the elastic response and the 90 degrees out-of-phase the viscous response. From the in-phase information, the storage modulus (G',E') is determined. The storage modulus is a measure of a sample's ability to store energy and is called the elastic modulus. From the 90 degrees out-of-phase information the loss modulus (G", E") can be determined. The loss modulus is a measure of a sample's ability to dissipate energy. The ratio of the loss modulus to the storage modulus is called tan delta, and represents the damping properties of the sample.

The test is typically run by clamping a sample into a dynamic mechanical analyzer, and subjecting it to an oscillatory deformation while being heated or cooled at some controlled rate. The resonant frequency of the sample and mechanical clamp assembly is continuously monitored as a function of temperature. As the viscoelastic response of the material changes over some temperature range, the electrical energy required to maintain a constant level of sample deformation also changes and is continuously monitored. Quantitative analysis routines are used to calculate the modulus (stiffness) and viscoelastic loss characteristics of a specimen as a function of temperature or time. As tan delta is a ratio, it is a unitless value.

The temperature range over which the product is expected to perform lies between about −40° C. to about 200° C., depending on the working limit of the elastomer. For example, a motor typically used in most automotive and power tool applications operates in the range of −20° C. to 140° C. within a frequency spectrum of up to 20,000 Hz. The frequency is based on motor shaft speed and dynamics. Most small electrical motors fall within the 500 to 6000 rpm range with frequencies in the range of about 10 to 100 Hz.

The elastomeric polymer, from which the elastomer sleeve used in this invention is made, may have a tan delta of at least about 0.02, preferably at least about 0.05, and more preferably at least about 0.08, and yet about 0.15 or less, preferably about 0.12 or less, and more preferably about 0.1 or less. A higher tan delta value will produce a greater dampening effect on the system, and as motor speed increases, the elastomer from which the bearings in that motor is made should thus have an increased tan delta as well. The tan delta figures stated above are typically determined in a temperature range of about 20–30° C., preferably at about 23° C.

The elastomeric polymer, from which the elastomer sleeve used in this invention is made, may also be characterized by Shore A hardness. Shore A hardness is determined with a durometer, which measures the resistance of a sample toward indentation. If the indenter foot completely penetrates the sample, a reading of 0 is obtained, and if no penetration occurs, a reading of 100 results. The test is typically run according to ASTM D-2240 or ISO 868, and the reading is dimensionless. The elastomer may have a Shore A hardness of at least about 30, preferably at least about 35, and more preferably at least about 40, and yet about 100 or less, preferably about 90 or less, and more preferably about 70 or less.

The elastomeric polymers from which a sleeve may be made in this invention include, but are not limited to, olefinic (e.g. butadiene-base) elastomers; styrenic elastomers; thermoplastic elastomers; cross-linked elastomers; poly(ether/ester) elastomers; nitrile rubbers; silicone rubbers; EPDM, such as Nordel® rubbers; neoprene rubbers; Vamac® polymers; Viton® polymers; and other natural and synthetic rubbers and elastomers known to those skilled in the art (many of the foregoing are commercially available from E. I. du Pont de Nemours and Company or DuPont Dow Elastomers LLC).

Any of the high performance polymers suitable for use in making a bearing in this invention may be paired with any of the elastomers suitable for making a sleeve to form the bearing/elastomer sleeve system of this invention.

In a particular embodiment, a bearing system for a rotating shaft having a centerline may involve
- (a) a bearing having a cylindrical space in which the shaft rotates, the cylindrical space having a centerline, the bearing being prepared from a polymer having a wear value of in the range of about $2 \times 10^{-6}$ to about $2 \times 10^{-5}$ mm$^3$/hr when determined at a PV value in the range of about 0.01 to about 2.5 MPa·m/s; and
- (b) a sleeve having a uniform wall thickness and a cylindrical space in which the bearing resides in an interference fit, the sleeve being prepared from an elastomer having a tan delta value of at least about 0.02 when determined at a temperature in the range of about 20 to about 30° C.;
- wherein the rotation of the shaft is not lubricated, and the sleeve is compressible by movement of the shaft during which the centerline of the shaft is parallel to the centerline of the bearing.

In another embodiment, a bearing system for a rotating shaft having a centerline may involve
- (a) a bearing having a cylindrical space in which the shaft rotates, the cylindrical space having a centerline, the bearing being prepared from a polymer having a coefficient of friction about 0.3 or less when determined at a PV value in the range of about 0.01 to about 2.5 MPa·m/s; and
- (b) a sleeve having a uniform wall thickness and a cylindrical space in which the bearing resides in an interference fit, the sleeve being prepared from an elastomer having a tan delta value of at least about 0.02 when determined at a temperature in the range of about 20 to about 30° C.;
- wherein the rotation of the shaft is not lubricated, and the sleeve is compressible by movement of the shaft during which the centerline of the shaft is parallel to the centerline of the bearing.

The invention is more fully demonstrated by the following examples, in which the third and fourth tests are run according to this invention.

In order to understand the noise and vibration phenomena created by rubbing at the bearing level, an instrumental bench was created. A small electrical motor's rotor was replaced by a Jeffcot rotor of similar properties (mass 470 grams, eccentricity $6.10^{-6}$ m, and distance between the two bearings of 80 mm). A Bently Nevada bench was mounted to enable modification of the horizontal and vertical positions of the shaft. Data acquisition was controlled by computer software of the Bently Nevada bench system. Movement of the bearing was measured by proximity sensors, two at each bearing, installed horizontally and vertically to record the orbits of displacement. A high speed camera was installed to record the movement of the bearing. The camera was able to record up to 40,500 pictures per second to clearly visualize performance. The movement was also recorded with a conventional camera with sound recording.

A polyimide bearing (such as those produced as Vespel® parts and shapes by E. I. du Pont de Nemours and Company) having an outside diameter of 14 mm and length of 6 mm was installed into metal retainers, supporting a shaft diameter of 10 mm. A running clearance between 0.1 mm and 0.2 mm was chosen for the test. The shaft was set at an angle of 45° versus the horizontal position to facilitate the "reverse whirl" effect, (i.e., instability in the system). Shaft speed was then gradually increased.

For the first test, a bearings was used with a running clearance of 0.1 mm. The reverse whirl phenomenon accompanied by a squealing noise appeared at 2,664 rpm. The recorded reverse whirl speed was 4,803 rpm.

A second test was performed with a running clearance of 0.1 mm. The reverse whirl and noise appeared at 2,756 rpm, reverse whirl speed of 5,190 rpm.

A third test was performed with a bearing having a running clearance of 0.16 mm, surrounded by a Hytrel® 6356 thermoplastic elastomer ring with an outside diameter of 22 mm. The phenomenon appeared at 2,827 rpm with a reverse whirl speed of 6,380 rpm. The measured dampening characteristic of the Hytrel® thermoplastic elastomer ring was approximately 4%.

The fourth test used a higher clearance (normally having a negative effect on stability) of 0.2 mm. The polyimide bearing was surrounded by a neoprene elastomer ring 22 mm in diameter. The reverse whirl effect did not occur up to about 6,000 rpm, therefore preventing the squealing noise detected in the earlier tests. The dampening characteristic of the elastomer was calculated to be approximately 10%. Analysis of the camera records nevertheless showed movement of the shaft from left to right, but without rotation on itself. It was determined that dampening of the shaft's impact on the bearing was the cause of the reduction in the vibration and noise levels.

The dampening effect of the elastomer sleeve is indicated in the third and fourth tests by the fact that the onset of reverse whirl did not occur until the motor had reached a much higher speed than in the first and second tests.

Preferred embodiments of the invention having been thus described by way of example, it will be apparent to those skilled in the art that modifications and adaptations may be made without departing from the scope of the invention, as set out in the appended claims.

What is claimed is:

1. A bearing system for a rotating shaft having a centerline, comprising
   (a) a bearing having a cylindrical space in which the shaft rotates, the cylindrical space having a centerline, the bearing being prepared from a polymer having a wear value of in the range of about $2 \times 10^{-6}$ to about $2 \times 10^{-5}$ mm$^3$/hr when determined at a PV value in the range of about 0.01 to about 2.5 MPa·m/s; and (b) a sleeve having a uniform wall thickness and a cylindrical space in which the bearing resides in an interference fit, the sleeve being prepared from an elastomer having a tan delta value of at least about 0.02 when determined at a temperature in the range of about 20 to about 30° C.;

wherein the rotation of the shaft is not lubricated, and the sleeve is compressible by movement of the shaft during which the centerline of the shaft is parallel to the centerline of the bearing.

2. A bearing system according to claim 1 wherein the polymer has a coefficient of friction about 0.3 or less when determined at a PV value in the range of about 0.01 to about 2.5 MPa·m/s.

3. A bearing system according to claim 2 wherein the coefficient of friction is about 0.2 or less.

4. A bearing system according to claim 1 wherein the PV value is derived from a pressure in the range of about 0.05 to about 0.25 MPa and a velocity in the range of about 0.2 to about 10 m/s.

5. A bearing system according to claim 1 wherein the polymer is selected from the group consisting of polyimides, polyamides, polyamideimides, acetals, polyetheretherketones, polyetherketoneketones, polyetherimides, liquid chrystal polymers, fluoropolymers, phenolics, polyethersulfides, polyphenyl sulfides, polyphenyl sulfones.

6. A bearing system according to claim 1 wherein the polymer is polyimide.

7. A bearing system according to claim 1 wherein the elastomer has a tan delta value of at least about 0.08.

8. A bearing system according to claim 1 wherein the elastomer has a Shore A hardness value of at least 30.

9. A bearing system according to claim 1 wherein the elastomer sleeve comprises a material selected from the group consisting of thermoplastic elastomers, cross-linked elastomers, and natural and synthetic rubbers.

10. A bearing system according to claim 1 wherein the elastomer sleeve is prepared from one or more of a neoprene rubber and a poly(ether/ester) elastomer.

11. A bearing system according to claim 1 further comprising a metal ring surrounding the elastomer sleeve.

12. A bearing system according to claim 1 wherein the bearing is only partially encompassed longitudinally by the elastomer sleeve.

13. A bearing system for a rotating shaft having a centerline, comprising
(a) a bearing having a cylindrical space in which the shaft rotates, the cylindrical space having a centerline, the bearing being prepared from a polymer having a coefficient of friction about 0.3 or less when determined at a PV value in the range of about 0.01 to about 2.5 MPa·m/s; and
(b) a sleeve having a uniform wall thickness and a cylindrical space in which the bearing resides in an interference fit, the sleeve being prepared from an elastomer having a tan delta value of at least about 0.02 when determined at a temperature in the range of about 20 to about 30° C.;

wherein the rotation of the shaft is not lubricated, and the sleeve is compressible by movement of the shaft during which the centerline of the shaft is parallel to the centerline of the bearing.

14. A bearing system according to claim 13 wherein the coefficient of friction is about 0.2 or less.

15. A bearing system according to claim 13 wherein the polymer has a wear value in the range of about $2\times10^{-6}$ to about $2\times10^{-5}$ mm$^3$/hr when determined at a PV value in the range of about 0.01 to about 2.5 MPa·m/s.

16. A bearing system according to claim 13 wherein the PV value is derived from a pressure in the range of about 0.05 to about 0.25 MPa and a velocity in the range of about 0.2 to about 10 m/s.

17. A bearing system according to claim 13 wherein the polymer is polyimide.

18. A bearing system according to claim 13 wherein the elastomer has a tan delta value of at least about 0.08.

19. A bearing system according to claim 13 wherein the elastomer sleeve is prepared from one or more of a neoprene rubber and a poly(ether/ester) elastomer.

20. A fractional horsepower motor comprising a bearing system according to claim 1 or claim 13.

* * * * *